Patented Apr. 10, 1928.

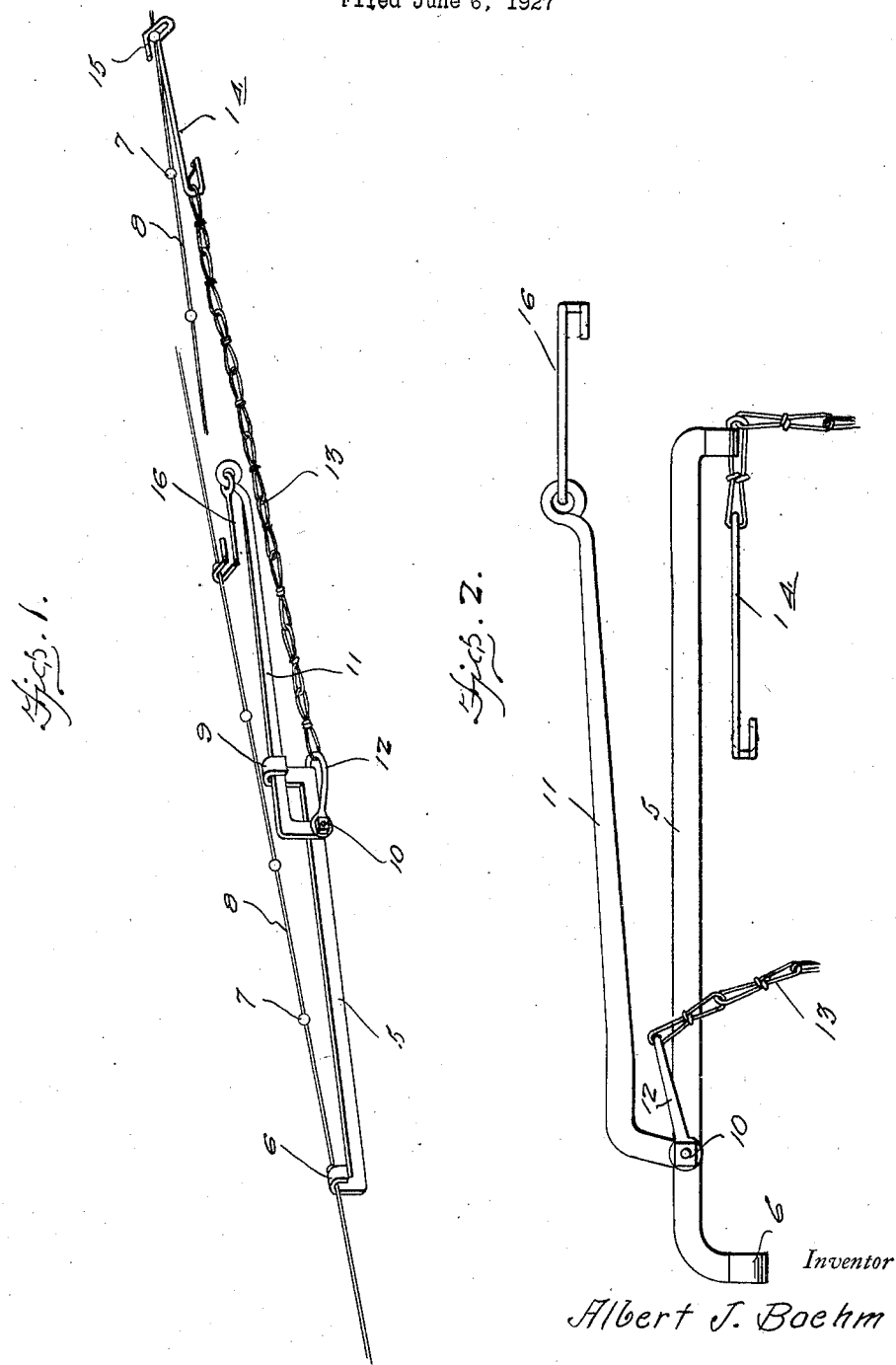

1,665,525

UNITED STATES PATENT OFFICE.

ALBERT J. BOEHM, OF PRINCETON, MINNESOTA.

WIRE SPLICER.

Application filed June 6, 1927. Serial No. 196,899.

My invention relates to wire splicers adapted particularly for use in the splicing of corn planter wires.

An object of the invention is to provide a wire splicing apparatus adapted to be folded into a compact form when not in use and having means for engaging the broken ends of a corn planter wire with one end of the device forming a pivotal connection on the wire, a chain connection with the opposite portion of the wire and an operating lever interposed therebetween whereby to draw the ends of the wire together in overlapping relation so as to permit the same to be secured together.

Other objects and advantages reside in the special construction, combination and arrangement of the various elements forming the invention as more fully hereinafter described and claimed, reference being had to the accompanying drawings forming part hereof, wherein:

Figure 1 is a perspective view showing the device in wire attaching position ready to have the lever swung upwardly for drawing the ends of the wire together, and Figure 2 shows the device in folded position when not in use.

Referring to the drawing I have shown my invention comprising a rigid bar 5 having a hook 6 arranged at one end thereof adapted to engage one of the knobs 7 formed at intervals along a corn planter wire 8 and a similar hook 9 formed at its opposite end thereof. A pin 10 extends transversely through the rod near the end thereof carrying the hook 9 and upon which is pivotally carried the angular end of a substantially L-shaped lever 11, the arm of the lever being adapted to fit under the hook 9 of the rod 5.

A clevis 12 has its ends pivotally arranged on the pin 10 and to which extends a chain 13 having its opposite end provided with a snap fastener 14 with one end thereof formed into a hook 15 adapted to engage one of the knobs 7 arranged on the opposite portion of the severed planter wire 8.

Upon the free end of the lever 11 is carried a similar hook 16 engaging one of the knobs 7 arranged on the same end of the severed wire as that engaged by the hook 6 of the rod 5.

Figure 1 of the drawing shows the invention attached to the opposite ends of a severed corn planter wire ready for drawing said ends in overlapping relation whereby to secure the same. It will thus be seen that one end of the broken wire has been engaged by the hook 15 and the opposite portion of the broken wire has been engaged by the hook 16 carried on the lever 11. This connection is made so as to bring the ends of the wire as closedy together as possible in advance of the stretching operation. The hook 6 is then placed over the wire 8 so as to engage one of the knobs 7 and such engagement of the hook operates as the pivot point for the lever 11 and the rod 5 which it will be seen forms a rigid connection in extended relation by reason of the engagement of the lever by the hook 9, and by raising the lever upwardly the end of the wire engaged by the hook 15 is drawn in a direction toward the end of the wire engaged by the hook 6. After moving the lever in a reverse position to that shown in Figure 1, it will be seen that the ends of the wire will be brought into overlapping position sufficiently to enable the same to be securely tied together.

As shown in Figure 2 of the drawing the parts comprising the invention may be folded into a fairly copact arrangement whereby to conveniently handle and ship the same.

It is obvious that the invention is susceptible to various changes and modifications without departing from the spirit thereof or the scope of the appended claims and I accordingly claim all such forms of the device to which I am entitled.

I claim:

1. In a device of the class described, a rod having one end attachable to a section of wire, a chain attached to the opposite end of said rod, wire attaching means carried by the free end of the chain for attaching the same to another strand of wire, and a rigid extendible member pivotally secured at one end adjacent one end of said rod, said rod having means formed thereon for engaging said member and securing the same in extended position and permitting relative pivotal movement in one direction, and wire attaching means carried at the outer end of the member releasably securing the same against pivotal movement.

2. A wire splicer, a rod having a pair of hooks at each end thereof, one of said hooks being adapted to engage one end of a broken wire, a lever pivotally secured at the opposite end of the rod and engageable with the other hook thereon whereby to secure the lever in rigid extended relation, a chain having one end attached to the lever end of the rod and having a snap fastener provided with a hook at the opposite end of the chain whereby to engage the opposite end of a broken wire and a hook carried by the extended end of the lever and engageable with the end of said first named broken wire.

In testimony whereof I affix my signature.

ALBERT J. BOEHM.